United States Patent
Rayner (10) Patent No.: US 8,962,183 B2
(45) Date of Patent: Feb. 24, 2015

(54) METHOD OF MAKING SILICON ANODE MATERIAL FOR RECHARGEABLE CELLS

(75) Inventor: Philip John Rayner, Huntingdon (GB)

(73) Assignee: Nexeon Limited, Oxfordshire (GB)

( * ) Notice: Subject to any disclaimer, the term of this patent is extended or adjusted under 35 U.S.C. 154(b) by 0 days.

(21) Appl. No.: 13/266,683

(22) PCT Filed: May 7, 2010

(86) PCT No.: PCT/GB2010/000943
§ 371 (c)(1),
(2), (4) Date: Jan. 3, 2012

(87) PCT Pub. No.: WO2010/128310
PCT Pub. Date: Nov. 11, 2010

(65) Prior Publication Data
US 2012/0129049 A1    May 24, 2012

(30) Foreign Application Priority Data
May 7, 2009  (GB) .................................. 0907891.6

(51) Int. Cl.
| H01M 4/134 | (2010.01) |
| H01M 4/38 | (2006.01) |
| H01B 13/00 | (2006.01) |
| C22C 21/02 | (2006.01) |
| C22C 21/04 | (2006.01) |
| H01M 4/525 | (2010.01) |
| H01M 10/0525 | (2010.01) |

(52) U.S. Cl.
CPC .................. C22C 21/02 (2013.01); C22C 21/04 (2013.01); H01M 4/38 (2013.01); H01M 4/134 (2013.01); H01M 4/525 (2013.01); H01M 10/0525 (2013.01)
USPC ........................... 429/218.1; 429/226; 216/13

(58) Field of Classification Search
USPC .................................... 429/218.1, 226; 216/13
See application file for complete search history.

(56) References Cited

U.S. PATENT DOCUMENTS

| | | | |
|---|---|---|---|
| 3,351,445 A | 11/1967 | Fielder et al. | |
| 4,002,541 A | * 1/1977 | Streander | 205/50 |
| 4,436,796 A | 3/1984 | Huggins et al. | |
| 4,950,566 A | 8/1990 | Huggins et al. | |
| 5,260,148 A | 11/1993 | Idota | |
| 5,262,021 A | 11/1993 | Lehmann et al. | |
| 5,660,948 A | 8/1997 | Barker | |
| 5,907,899 A | 6/1999 | Dahn et al. | |
| 5,980,722 A | 11/1999 | Kuroda et al. | |
| 6,022,640 A | 2/2000 | Takada et al. | |
| 6,042,969 A | 3/2000 | Yamada et al. | |
| 6,063,995 A | 5/2000 | Bohland et al. | |
| 6,235,427 B1 | 5/2001 | Idota et al. | |
| 6,296,969 B1 | 10/2001 | Yano et al. | |
| 6,334,939 B1 | 1/2002 | Zhou et al. | |
| 6,337,156 B1 | 1/2002 | Narang et al. | |
| 6,353,317 B1 | 3/2002 | Green et al. | |
| 6,399,177 B1 | 6/2002 | Fonash et al. | |
| 6,399,246 B1 | 6/2002 | Vandayburg et al. | |
| 6,428,909 B2 | 8/2002 | Oketani et al. | |
| 6,589,696 B2 | 7/2003 | Matsubara et al. | |
| 6,605,386 B1 | 8/2003 | Kasamatsu et al. | |
| 6,620,547 B1 | 9/2003 | Sung et al. | |
| 6,887,511 B1 | 5/2005 | Shima et al. | |
| 6,916,679 B2 | 7/2005 | Snyder et al. | |
| 7,033,936 B1 | 4/2006 | Green | |
| 7,051,945 B2 | 5/2006 | Empedocles et al. | |
| 7,070,632 B1 | 7/2006 | Visco et al. | |
| 7,094,499 B1 | 8/2006 | Hung | |
| 7,147,894 B2 | 12/2006 | Zhou et al. | |
| 7,192,673 B1 | 3/2007 | Ikeda et al. | |
| 7,311,999 B2 | 12/2007 | Kawase et al. | |
| 7,318,982 B2 | 1/2008 | Gozdz et al. | |
| 7,348,102 B2 | 3/2008 | Li et al. | |
| 7,358,011 B2 | 4/2008 | Fukuoka et al. | |
| 7,378,041 B2 | 5/2008 | Asao et al. | |
| 7,425,285 B2 | 9/2008 | Asao et al. | |
| 7,476,469 B2 | 1/2009 | Ota et al. | |
| 7,569,202 B2 | 8/2009 | Farrell et al. | |
| 7,659,034 B2 | 2/2010 | Minami et al. | |
| 7,674,552 B2 | 3/2010 | Nakai et al. | |
| 7,767,346 B2 | 8/2010 | Kim et al. | |
| 7,862,933 B2 | 1/2011 | Okumura et al. | |
| 8,034,485 B2 | 10/2011 | Dehn et al. | |
| 8,597,831 B2 | 12/2013 | Green et al. | |

(Continued)

FOREIGN PATENT DOCUMENTS

| CN | 1821446 A | 8/2006 |
| CN | 101266919 A | 9/2008 |

(Continued)

OTHER PUBLICATIONS

Badel et al., "Formation of Ordered Pore Arrays at the Nanoscale by Electrochemical Etching of N-Type Silicon", Superlattices and Microstructures, 36 (2004) 245-253.
Barraclough et al., "Cold Compaction of Silicon Powders Without a Binding Agent", Materials Letters 61 (2007) 485-487.
Beaulieu et al., "Colossal Reversible Volume Changes in Lithium Alloys", Electrochemical and Solid-State Letters, 4 (9) (2001) A137-A140.
Beaulieu et al., "Reaction of Li with Grain-Boundary Atoms in Nanostructured Compounds", Journal of The Electrochemical Society, 147 (9) (2000) 3206-3212.
International Search Report for PCT/GB2010/000943 dated Jul. 19, 2010.

(Continued)

*Primary Examiner* — Muhammad Siddiquee
(74) *Attorney, Agent, or Firm* — McDonnell Boehnen Hulbert & Berghoff LLP (57) ABSTRACT

A method of forming a silicon anode material for rechargeable cells includes providing a metal matrix that includes no more than 30 wt % of silicon, including silicon structures dispersed therein. The metal matrix is at least partially etched to at least partially isolate the silicon structures.

31 Claims, 6 Drawing Sheets

(56) References Cited

U.S. PATENT DOCUMENTS

| | | |
|---|---|---|
| 2001/0023986 A1 | 9/2001 | Mancevski |
| 2002/0148727 A1 | 10/2002 | Zhou et al. |
| 2003/0135989 A1 | 7/2003 | Huggins et al. |
| 2004/0072067 A1 | 4/2004 | Minami et al. |
| 2004/0126659 A1 | 7/2004 | Graetz et al. |
| 2004/0151987 A1 | 8/2004 | Kawase et al. |
| 2004/0166319 A1 | 8/2004 | Li et al. |
| 2004/0185346 A1 | 9/2004 | Takeuchi et al. |
| 2004/0197660 A1 | 10/2004 | Sheem et al. |
| 2004/0214085 A1 | 10/2004 | Sheem et al. |
| 2004/0224231 A1 | 11/2004 | Fujimoto et al. |
| 2004/0241548 A1 | 12/2004 | Nakamoto et al. |
| 2005/0042515 A1 | 2/2005 | Hwang et al. |
| 2005/0079414 A1 | 4/2005 | Yamamoto et al. |
| 2005/0079420 A1 | 4/2005 | Cho et al. |
| 2005/0118503 A1 | 6/2005 | Honda et al. |
| 2005/0191550 A1 | 9/2005 | Satoh et al. |
| 2005/0193800 A1 | 9/2005 | DeBoer et al. |
| 2005/0214644 A1 | 9/2005 | Aramata et al. |
| 2006/0003226 A1 | 1/2006 | Sawa et al. |
| 2006/0019115 A1 | 1/2006 | Wang et al. |
| 2006/0019168 A1 | 1/2006 | Li et al. |
| 2006/0024582 A1 | 2/2006 | Li et al. |
| 2006/0051670 A1 | 3/2006 | Aramata et al. |
| 2006/0057463 A1 | 3/2006 | Gao et al. |
| 2006/0088767 A1 | 4/2006 | Li et al. |
| 2006/0097691 A1* | 5/2006 | Green ........................... 320/107 |
| 2006/0134516 A1 | 6/2006 | Im et al. |
| 2006/0134518 A1 | 6/2006 | Kogetsu et al. |
| 2006/0147800 A1 | 7/2006 | Sato et al. |
| 2006/0154071 A1 | 7/2006 | Homma et al. |
| 2006/0166030 A1* | 7/2006 | Suzuki et al. ................. 428/654 |
| 2006/0166093 A1 | 7/2006 | Zaghib et al. |
| 2006/0175704 A1 | 8/2006 | Shimizu et al. |
| 2006/0257307 A1 | 11/2006 | Yang |
| 2006/0263687 A1 | 11/2006 | Leitner et al. |
| 2006/0275663 A1 | 12/2006 | Matsuno et al. |
| 2006/0275668 A1 | 12/2006 | Peres et al. |
| 2006/0286448 A1 | 12/2006 | Snyder et al. |
| 2007/0003835 A1 | 1/2007 | Hasegawa et al. |
| 2007/0026313 A1 | 2/2007 | Sano |
| 2007/0031733 A1 | 2/2007 | Kogetsu et al. |
| 2007/0037063 A1 | 2/2007 | Choi et al. |
| 2007/0048609 A1 | 3/2007 | Yeda et al. |
| 2007/0059598 A1 | 3/2007 | Yang |
| 2007/0065720 A1 | 3/2007 | Hasewaga et al. |
| 2007/0072074 A1 | 3/2007 | Yamamoto et al. |
| 2007/0087268 A1 | 4/2007 | Kim et al. |
| 2007/0099084 A1 | 5/2007 | Huang et al. |
| 2007/0099085 A1 | 5/2007 | Choi et al. |
| 2007/0105017 A1 | 5/2007 | Kawase et al. |
| 2007/0117018 A1 | 5/2007 | Huggins |
| 2007/0122702 A1 | 5/2007 | Sung et al. |
| 2007/0148544 A1 | 6/2007 | Le |
| 2007/0172732 A1 | 7/2007 | Jung et al. |
| 2007/0184345 A1 | 8/2007 | Neudecker et al. |
| 2007/0190413 A1 | 8/2007 | Lee et al. |
| 2007/0202395 A1 | 8/2007 | Snyder et al. |
| 2007/0202402 A1 | 8/2007 | Asahina et al. |
| 2007/0207080 A1 | 9/2007 | Yang |
| 2007/0207385 A1 | 9/2007 | Liu et al. |
| 2007/0209584 A1 | 9/2007 | Kalynushkin et al. |
| 2007/0212538 A1 | 9/2007 | Niu |
| 2007/0218366 A1 | 9/2007 | Kalynushkin et al. |
| 2007/0224508 A1 | 9/2007 | Aramata et al. |
| 2007/0224513 A1 | 9/2007 | Kalynushkin et al. |
| 2007/0238021 A1 | 10/2007 | Liu et al. |
| 2007/0243469 A1 | 10/2007 | Kim et al. |
| 2007/0264564 A1 | 11/2007 | Johnson et al. |
| 2007/0264574 A1 | 11/2007 | Kim et al. |
| 2007/0269718 A1 | 11/2007 | Krause et al. |
| 2007/0277370 A1 | 12/2007 | Kalynushkin et al. |
| 2008/0003496 A1 | 1/2008 | Neudecker et al. |
| 2008/0003503 A1 | 1/2008 | Kawakami et al. |
| 2008/0020281 A1 | 1/2008 | Kogetsu et al. |
| 2008/0038638 A1 | 2/2008 | Zhang et al. |
| 2008/0090149 A1 | 4/2008 | Sano et al. |
| 2008/0096110 A1 | 4/2008 | Bito et al. |
| 2008/0107967 A1 | 5/2008 | Liu et al. |
| 2008/0113271 A1 | 5/2008 | Ueda et al. |
| 2008/0118834 A1 | 5/2008 | Yew et al. |
| 2008/0124631 A1 | 5/2008 | Fukui et al. |
| 2008/0131782 A1 | 6/2008 | Hagiwara et al. |
| 2008/0138710 A1 | 6/2008 | Liaw et al. |
| 2008/0138716 A1 | 6/2008 | Iwama et al. |
| 2008/0145752 A1 | 6/2008 | Hirose et al. |
| 2008/0145759 A1 | 6/2008 | Sung et al. |
| 2008/0160415 A1 | 7/2008 | Wakita et al. |
| 2008/0176139 A1 | 7/2008 | White et al. |
| 2008/0206631 A1 | 8/2008 | Christensen et al. |
| 2008/0206641 A1 | 8/2008 | Christensen et al. |
| 2008/0233479 A1 | 9/2008 | Sung et al. |
| 2008/0233480 A1* | 9/2008 | Sung et al. ................. 429/220 |
| 2008/0241647 A1 | 10/2008 | Fukui et al. |
| 2008/0241703 A1 | 10/2008 | Yamamoto et al. |
| 2008/0248250 A1 | 10/2008 | Flemming et al. |
| 2008/0261112 A1 | 10/2008 | Nagata et al. |
| 2008/0305391 A1 | 12/2008 | Hirose et al. |
| 2009/0053589 A1 | 2/2009 | Obrovac et al. |
| 2009/0078982 A1 | 3/2009 | Rachmady et al. |
| 2009/0087731 A1 | 4/2009 | Fukui et al. |
| 2009/0101865 A1 | 4/2009 | Matsubara et al. |
| 2009/0117466 A1 | 5/2009 | Zhamu et al. |
| 2009/0186267 A1* | 7/2009 | Tiegs ........................... 429/129 |
| 2009/0239151 A1 | 9/2009 | Nakanishi et al. |
| 2009/0253033 A1 | 10/2009 | Hirose et al. |
| 2009/0269677 A1 | 10/2009 | Hirose et al. |
| 2009/0305129 A1 | 12/2009 | Fukui et al. |
| 2010/0085685 A1 | 4/2010 | Pinwill |
| 2010/0092868 A1 | 4/2010 | Kim et al. |
| 2010/0124707 A1 | 5/2010 | Hirose et al. |
| 2010/0136437 A1 | 6/2010 | Nishida et al. |
| 2010/0151324 A1* | 6/2010 | Green et al. ................. 429/220 |
| 2010/0285358 A1 | 11/2010 | Cui et al. |
| 2010/0297502 A1 | 11/2010 | Zhu et al. |
| 2010/0330419 A1 | 12/2010 | Cui et al. |

FOREIGN PATENT DOCUMENTS

| | | |
|---|---|---|
| CN | 101442124 A | 5/2009 |
| DE | 199 22 257 A1 | 11/2000 |
| DE | 103 47 570 A1 | 5/2005 |
| EP | 0 281 115 A2 | 9/1988 |
| EP | 0 553 465 A1 | 8/1993 |
| EP | 0 820 110 A2 | 1/1998 |
| EP | 1 011 160 A1 | 6/2000 |
| EP | 0 936 687 B1 | 12/2001 |
| EP | 1 231 653 A1 | 8/2002 |
| EP | 1 231 654 A1 | 8/2002 |
| EP | 1 258 937 A1 | 11/2002 |
| EP | 1 083 614 B1 | 5/2003 |
| EP | 1 313 158 A2 | 5/2003 |
| EP | 1 335 438 A1 | 8/2003 |
| EP | 1 289 045 B1 | 3/2006 |
| EP | 1 657 769 A1 | 5/2006 |
| EP | 1 850 409 A1 | 10/2007 |
| EP | 1 771 899 B1 | 2/2008 |
| EP | 1 657 768 B1 | 5/2008 |
| EP | 2 058 882 A1 | 5/2009 |
| EP | 2 204 868 A3 | 7/2010 |
| FR | 2 885 913 B1 | 8/2007 |
| GB | 0 980 513 | 1/1965 |
| GB | 1 014 706 | 12/1965 |
| GB | 2 395 059 A | 5/2004 |
| GB | 2 464 157 B | 1/2010 |
| GB | 2 464 158 | 4/2010 |
| JP | 02-209492 A | 8/1990 |
| JP | 06-283156 | 10/1994 |
| JP | 10-046366 | 2/1998 |
| JP | 10-083817 | 3/1998 |
| JP | 10-199524 | 7/1998 |
| JP | 2000-003727 | 1/2000 |
| JP | 2000-173594 | 6/2000 |
| JP | 2000-348730 A | 12/2000 |

(56) References Cited

FOREIGN PATENT DOCUMENTS

| | | |
|---|---|---|
| JP | 2001-291514 | 10/2001 |
| JP | 2002-279974 A | 9/2002 |
| JP | 2002-313319 A | 10/2002 |
| JP | 2003-017040 | 1/2003 |
| JP | 2003-168426 | 6/2003 |
| JP | 04-607488 B2 | 2/2004 |
| JP | 2004-071305 | 3/2004 |
| JP | 2004-095264 | 3/2004 |
| JP | 2004-214054 | 7/2004 |
| JP | 2004-281317 | 10/2004 |
| JP | 2004-296386 A | 10/2004 |
| JP | 2004-533699 A | 11/2004 |
| JP | 2005-310759 A | 11/2005 |
| JP | 2006-505901 A | 2/2006 |
| JP | 2006-276214 A | 10/2006 |
| JP | 2006-290938 A | 10/2006 |
| JP | 2006-335410 A | 12/2006 |
| JP | 2007080827 A | 3/2007 |
| JP | 2007-165079 A | 6/2007 |
| JP | 2008-034266 | 2/2008 |
| JP | 2008-186732 | 8/2008 |
| JP | 2008210618 A | 9/2008 |
| JP | 2008-234988 | 10/2008 |
| JP | 2008277000 A | 11/2008 |
| JP | 2009523923 A | 6/2009 |
| JP | 2009-252348 A | 10/2009 |
| JP | 2010192444 A | 9/2010 |
| JP | 5000787 B2 | 8/2012 |
| JP | 2013510405 A | 3/2013 |
| KR | 20050090218 A | 9/2005 |
| KR | 2007-023141 | 2/2007 |
| KR | 2007-0110569 A | 11/2007 |
| KR | 2008-038806 A | 5/2008 |
| NL | 1015956 | 8/2000 |
| SU | 471402 | 5/1975 |
| SU | 544019 | 1/1977 |
| WO | WO 99/33129 | 7/1999 |
| WO | WO 01/13414 A1 | 2/2001 |
| WO | WO 01/35473 A1 | 5/2001 |
| WO | WO 01/96847 A1 | 12/2001 |
| WO | WO 02/25356 A2 | 3/2002 |
| WO | WO 02/47185 A2 | 6/2002 |
| WO | WO 03/063271 A1 | 7/2003 |
| WO | WO 03/075372 A2 | 9/2003 |
| WO | WO 2004/042851 A2 | 5/2004 |
| WO | WO 2004/052489 A2 | 6/2004 |
| WO | WO 2004/083490 A2 | 9/2004 |
| WO | WO 2004/109839 A1 | 12/2004 |
| WO | WO 2005/011030 A1 | 2/2005 |
| WO | WO 2005/113467 A1 | 12/2005 |
| WO | WO 2005/119753 A2 | 12/2005 |
| WO | WO 2006/067891 A1 | 6/2006 |
| WO | WO 2006/073427 A2 | 7/2006 |
| WO | WO 2006/120332 A2 | 11/2006 |
| WO | WO 2007/044315 A1 | 4/2007 |
| WO | WO 2007/083152 A1 | 7/2007 |
| WO | WO 2007/083155 | 7/2007 |
| WO | WO 2007/114168 A1 | 10/2007 |
| WO | WO 2007/136164 A1 | 11/2007 |
| WO | WO 2008/029888 A1 | 3/2008 |
| WO | WO 2008/044683 A1 | 4/2008 |
| WO | WO 2008/072460 A1 | 6/2008 |
| WO | WO 2008/097723 A1 | 8/2008 |
| WO | WO 2008/139157 A1 | 11/2008 |
| WO | WO 2009/010757 | 1/2009 |
| WO | WO 2009/010758 | 1/2009 |
| WO | WO 2009/010759 | 1/2009 |
| WO | WO 2009/026466 | 2/2009 |
| WO | WO 2009/120404 A1 | 10/2009 |
| WO | WO 2009/128800 | 10/2009 |
| WO | WO 2010/040985 | 4/2010 |
| WO | WO 2010/040986 | 4/2010 |
| WO | WO 2010/060348 A1 | 6/2010 |
| WO | WO 2010/130975 A1 | 11/2010 |
| WO | WO 2010/130976 A1 | 11/2010 |

OTHER PUBLICATIONS

Written Opinion of the International Searching Authority for PCT/GB2010/000943 dated Jul. 19, 2010.
International Preliminary Report on Patentability of PCT/GB2010/000943 dated Nov. 17, 2011.
British Search Report of GB 0907891.6 dated Sep. 10, 2010.
Besenhard et al., "Will Advanced Lithium-Alloy Anodes Have a Chance in Lithium-Ion Batteries?", Journal of Power Sources, 68 (1997) 87-90.
Boukamp et al., "All-Solid Lithium Electrodes with Mixed-Conductor Matrix", J. Electrochem. Soc.: Electrochemical Science and Technology, vol. 128, No. 4, (1981) 725-729.
Bourderau, et al., "Amorphous Silicon as a Possible Anode Material for Li-Ion Batteries", Journal of Power Sources, 81-82 (1999) 233-236.
Canham, L. T., "Diffusion of Li IN Si", Properties of Silicon, EMIS Datareviews Series No. 4 (1987) 454-462.
Chan et al., "Surface Chemistry and Morphology of the Solid Electrolyte Interphase on Silicon Nanowire Lithium-Ion Battery Anodes", Journal of Power Sources, 189(2), 1132-1140, (2009).
Chang et al., "Ultrafast Growth of Single-Crystalline Si Nanowires", Materials Letters, 60 (2006) 2125-2128.
Chen et al., Binder Effect on Cycling Performance of Silicon/Carbon Composite Anodes for Lithium Ion Batteries, 36 (2006) 1099-1104.
Chen et al., "Effect of Vinylene Carbonate (VC) as Electrolyte Additive on Electrochemical Performance of Si Film Anode for Lithium Ion Batteries", Journal of Power Sources, 174(2), 538-543, (2007).
Chen et al., "Selective Etching of Silicon in Aqueous Ammonia Solution", Sensors and Actuators, A 49 (1995) 115-121.
Chevrier et al., "Methods for Successful Cycling of Alloy Negative Electrodes in Li-Ion Cells", $220^{th}$ ECS Meeting, Abstract #1237 (2011).
Choi et al., "Effect of Fluoroethylene Carbonate Additive on Interfacial Properties of Silicon Thin-Film Electrode", Journal of Power Sources, 161(2), 1254-1259 (2006).
Colinge, Jean-Pierre, "Silicon-on-Insulator Technology: Materials to VLSI", Chapter 2, SOI Materials, (1991), Cover page and p. 38.
Deal et al., "General Relationship for the Thermal Oxidation of Silicon", Journal of Applied Physics, vol. 36, No. 12, (Dec. 1965) 3770-3778.
El Ouatani et al., "The Effect of Vinylene Carbonate Additive on Surface Film Formation on Both Electrodes in Li-Ion Batteries", J. Electrochem. Soc., 156(2), A103-A113 (2009).
Feng et al., "Lithography-Free Silicon Micro-Pillars as Catalyst Supports for Microfabricated Fuel Cell Applications", Electrochemistry Communications, 8 (2006) 1235-1238.
Green et al., "Mesoscopic Hemisphere Arrays for use as Resist in Solid State Structure Fabrication", J. Vac. Sci. Technol. B 17(5) (1999) 2074-2083.
Green et al., "Quantum Pillar Structures on n+ Gallium Arsenide Fabricated Using "Natural" Lithography", Appl. Phys. Lett., 62 (3) (1993) 264-266.
Green et al., "Structured Silicon Anodes for Lithium Battery Applications", Electrochemical and Solid-State Letters, 6 (5) (2003) A75-A79.
Han et al., "Neutralized Poly (Acrylic Acid) as Polymer Binder for High Capacity Silicon Negative Electrodes", $220^{th}$ ECS Meeting, Abstract #1250 (2011).
Heinze et al., "Viscosity Behaviour of Multivalent Metal Ion-Containing Carboxymethyl Cellulose Solutions", Die Angewandte Makromolekulare Chamie 220, 123-132, (Nr. 3848), (1994).
Hochgatterer et al., "Silicon/Graphite Composite Electrodes for High Capacity Anodes: Influence of Binder Chemistry on Cycling Stability", Electrochemical and Solid-State Letters, 11 (5) (2008) A76-A80.
Huggins, Robert A., "Lithium Alloy Anodes" in Handbook of Battery Materials, J.O. Besenhard Ed., Wiley-VCH, Weinheim, 361-381 (1999).
Ivanovskaya et al., "The Effect of Treatment of Cation-Selective Glass Electrodes With AgNO3 Solution on Electrode Properties", Sensors and Actuators B 24-25 (1995) 304-308.

(56) References Cited

OTHER PUBLICATIONS

Jianfeng et al., "Large-Scale Array of Highly Oriented Silicon-Rich Micro/Nanowires Induced by Gas Flow Steering", Solid State Communications, 133 (2005) 271-275.

Kasavajjula et al., "Nano- and Bulk-Silicon-Based Insertion Anodes for Lithium-Ion Secondary Cells", Journal of Power Sources, 163 (2007) 1003-1039.

*Key to Metal Aluminum—Silicon Alloys*, www.keytometals.com/Article80.

Kim et al., "(110) Silicon Etching for High Aspect Ratio Comb Structures", 1997 6th International Conference on Emerging Technologies and Factory Automation Proceedings, (1997) 248-252.

Kim et al., "Improvement of Silicon Powder Negative Electrodes by Copper Electroless Deposition for Lithium Secondary Batteries", Journal of Power Sources, 147 (2005) 227-233.

Kleimann et al., "Formation of Wide and Deep Pores in Silicon by Electrochemical Etching", Materials Science and Engineering, B69-70 (2000) 29-33.

Kolasinski, Kurt W., "Silicon Nanostructures from Electroless Electrochemical Etching", Current Opinion in Solid State and Materials Science, 9 (2005) 73-83.

Komba et al., "Functional Interface of Polymer Modified Graphite Anode", Journal of Power Sources, 189, (2009), 197-203.

Komba et al., "Polyacrylate as Functional Binder for Silicon and Graphite Composite Electrode in Lithium-Ion Batteries", Electrochemistry, 79(1), (2010), 6-9.

Komba et al., "Polyacrylate Modifier for Graphite Anode of Lithium-Ion Batteries", Electrochemical and Solid-State Letters, 12(5), (2009), A107-A110.

Komba et al., "Study on Polymer Binders for High-Capacity SiO Negative Electrode of Li-Ion Batteries", Journal of Physical Chemistry, 115, (2011), 13487-13495.

Lang, Walter, "Silicon Microstructuring Technology", Materials Science and Engineering, R17 (1996) 1-55.

Lee et al., "Effect of Poly (Acrylic Acid) on Adhesion Strength and Electrochemical Performance of Natural Graphite Negative Electrode for Lithium-Ion Batteries", Journal of Power Sources, 161(1), (2006), 612-616.

Li et al., "A High Capacity Nano-Si Composite Anode Material for Lithium Rechargeable Batteries", Electrochemical and Solid-State Letters, 2 (11) (1999) 547-549.

Li et al., "Sodium Carboxymethyl Cellulose: A Potential Binder for Si Negative Electrodes for Li-Ion Batteries", Electrochemical and Solid-State Letters, 10(2) (2007), A17-A20.

Li et al., "The Crystal Structural Evolution of Nano-Si Anode Caused by Lithium Insertion and Extraction at Room Temperature", Solid State Ionics, 135 (2000) 181-191.

Liu et al., "A Novel Method of Fabricating Porous Silicon Material: Ultrasonically Enhanced Anodic Electrochemical Etching", Solid State Communications, 127 (2003) 583-588.

Liu et al., "Effect of Electrode Structure on Performance of Si Anode in Li-Ion Batteries: Si Particle Size and Conductive Additive", Journal of Power Source, 140 (2005) 139-144.

Liu et al., "Enhanced Cycle Life of Si Anode for Li-Ion Batteries by Using Modified Elastomeric Binder", Electrochemical and Solid-State Letters, 8(2) (2005), A100-A103.

Lu et al., "A Study of the Mechanisms of Erosion in Silicon Single Crystals Using Hertzian Fracture Tests", Wear, 186-187 (1995) 105-116.

Maranchi et al., "Interfacial Properties of the a-Si/Cu:Active-Inactive Thin-Film Anode Systems for Lithium-Ion Batteries", Journal of the Electrochemical Society: 153 (6) (2006) A1246-A1253.

Nakahata et al., "Fabrication of Lotus-Type Porous Silicon by Unidirectional Solidification in Hyrdogen", Materials Science and Engineering A 384 (2004) 373-376.

Niparko, J.K. (Editor), "Cochlear Implant Technology", Pub., Lippincott Williams and Wilkins, Philadelphia, (2000) 108-121.

Obrovac et al., "Structural Changes in Silicon Anodes During Lithium Insertion/Extraction", Electrochemical and Solid-State Letters, 7(5), (2004), A96-A96.

Ohara et al., "A Thin Film Silicon Anode for Li-Ion Batteries Having a Very Large Specific Capacity and Long Cycle Life", Journal of Power Sources, 136 (2004) 303-306.

Pei et al., "Silicon Nanowires Grown from Silicon Monoxide Under Hydrothermal Conditions", Journal of Crystal Growth, 289 (2006) 423-427.

Peng et al., "Dendrite-Assisted Growth of Silicon Nanowires in Electroless Metal Deposition", Adv. Funct. Mater., 13, No. 2 (2003) 127-132.

Peng et al., "Fabrication of Large-Area Silicon Nanowire p-n Junction Diode Arrays", Adv. Mater. (2004), vol. 16, No. 1, 73-76.

Peng et al., "Silicon Nanowires for Rechargeable Lithium-ion Battery Anodes", Applied Physics Letters (2008) vol. 93, No. 3, pp. 33105-1 to 33105-3.

Peng et al., "Simultaneous Gold Deposition and Formation of Silicon Nanowire Arrays", Journal of Electroanalytical Chemistry, 558 (2003) 35-39.

Peng et al., "Synthesis of Large-Area Silicon Nanowire Arrays via Self-Assembling Nanoelectrochemistry", Adv. Mater., 14, No. 16 (2002) 1164-1167.

Peng et al., "Uniform, Axial-Orientation Alignment of One-Dimensional Single-Crystal Silicon Nanostructure Arrays", Angew. Chem. Ind. Ed., 44 (2005) 2737-2742.

Peng, et al., "Fabrication of Single-Crystalline Silicon Nanowires by Scratching a Silicon Surface with Catalytic Metal Particles", Adv. Funct. Mater., 16 (2006), 387-394.

Wong et al., "Controlled Growth of Silicon Nanowires Synthesized Via Solid-Liquid-Solid Mechanism", Science and Technology of Advanced Materials, 6 (2005) 330-334.

Yabuuchi et al., "Graphite-Silicon-Polyacrylate Negative Electrodes in Ionic Liquid Electrolyte for Safer Rechargeable Li-Ion Batteries", Advanced Energy Materials, 1, (2011), 759-765.

Yan et al., "Growth of Amorphous Silicon Nanowires via a Solid-Liquid-Solid Mechanism", Chemical Physics Letters, 323 (2000) 224-228.

Yan et al., "$H_2$-Assisted Control Growth of Si Nanowires", Journal of Crystal Growth, 257 (2003) 69-74.

Yoshio et al., "Electrochemical Behaviors of Silicon Based Anode Material", Journal of Power Sources, 153 (2006) 375-379.

Zhang et al., "A Review on Electrolyte Additives for Lithium-Ion Batteries", Journal of Power Sources, 162(2), 1379-1394, (2006).

Zhang et al., "Bulk-Quantity Si Nanowires Synthesized by SiO Sublimation", Journal of Crystal Growth, 212 (2000) 115-118.

Zhang et al., "Catalytic Growth of $x$-$FiSi_2$ and Silicon Nanowires", Journal of Crystal Growth, 280 (2005) 286-291.

Zhang et al., "Synthesis of Thin Si Whiskers (Nanowires) Using $SiCl_4$", Journal of Crystal Growth, 2006 (2001) 185-191.

Qiu et al., "From S1 Nanotubes to Nanowires: Synthesis, Characterization, and Self-Assembly", Journal of Crystal Growth, 277 (2005) 143-148.

Qiu et al., "Self-Assembled Growth and Optical Emission of Silver-Capped Silicon Nanowires", Applied Physics Letters, vol. 84, No. 19, (2004) 3867-3869.

Sharma et al., "Thermodynamic Properties of the Lithium—Silicon System", J. Electrochem. Soc.: Electrochemical Science and Technology. vol. 123 (1976) 1763-1768.

Shin et al., "Porous Silicon Negative Electrodes for Rechargeable Lithium Batteries", Journal of Power Sources, 139 (2005) 314-320.

Sugama, et al., "Nature of Interfacial Interaction Mechanisms Between Polyacrylic Acid Macromolecules and Oxide Metal Surfaces", Journal of Materials Science, 19 (1984) 4045-4056.

Tokoro et al., "Anisotropic Etching Properties of Silicon in KOH and TMAH Solutions", Proceedings of the 1998 International Symposium on Micromechatronics and Human Science (1998) 65-70.

Tsuchiya et al., "Structural Fabrication Using Cesium Chloride Island Arrays as a Resist in a Fluorocarbon Reactive Ion Etching Plasma", Electrochemical and Solid-State Letters, 3 (1) (2000) 44-46.

Ui et al., "Improvement of Electrochemical Characteristics of Natural Graphite Negative Electrode Coated With Polyacrylic Acid in (56) References Cited

OTHER PUBLICATIONS

Pure Propylene Carbonate Electrolyte", Journal of Power Sources, 173(1), (2007), 518-521.

Wagner et al., "Vapor-Liquid-Solid Mechanism of Single Crystal Growth", Applied Physics Letters, vol. 4, No. 5 (1964) 89-90.

Wen et al., "Chemical Diffusion in Intermediate Phases in the Lithium—Silicon System", Journal of Solid State Chemistry, 37 (1981) 271-278.

Weydanz et al., "A Room Temperature Study of the Binary Lithium—Silicon and the Ternary Lithium—Chromium—Silicon System for use in Rechargeable Lithium Batteries", Journal of Power Sources, 81-82 (1999) 237-242.

Winter, et al., "Insertion Electrode Materials for Rechargeable Lithium Batteries", Advanced Materials, 1998, 10, No. 10.

De Angelis et al., "Water Soluble Nanoporous Nanoparticles for In Vivo Targeted Drug Deliver and Controlled Release in B Cells Tumor Context", Nanoscale, 1020, vol. 2, p. 2230-2236.

Garrido, et al., The Role of Chemical Species in the Passivation of <100> Silicon Surfaces by HF in Water-Ethanol Solutions, J. Electrochem Soc., vol. 143, No. 12, 1996, p. 4059-4066.

Russo, et al., "A Mechanical Approach to Porous Silicon Nanoparticles Fabrication", Materials 2011, vol. 4, p. 1023-1033.

Takami et al., "Silicon Fiber Formed on Silicon Without Using a Gas Process", Journal of Applied Physics, vol. 91, No. 12, 2-5 (2002).

Ye et al., Controllable Growth of Silver Nanostructures by a Simple Replacement Reaction and Their SERS Studies, Solid State Sciences 11 (2009), p. 1088-1093.

Peng, K. et al., "Metal-Particle-Induced, Highly Localized Site-Specific Etching of Si and Formation of Single-Crystalline Si Nanowires in Aqueous Fluoride Solution", Chemistry A European Journal 2006, 12, pp. 7942-7947 (2006).

"Peng Yun, et al. "Comparative Analysis of Two Different Treatment Technology in PCB Spent Etching-Cyclic Regeneration Technique and Copper Sulfate Processing Technique", Printed Circuit Information, No. 7, pp. 51-53, dated Jul. 10, 2007."

\* cited by examiner

FIGURE 1

PRIOR ART

METHOD OF MAKING SILICON ANODE MATERIAL FOR RECHARGEABLE CELLS

TECHNICAL FIELD

The invention relates to a method of forming silicon anode material for rechargeable cells, an electrode for a lithium-ion battery and a lithium-ion battery.

BACKGROUND ART

The recent increase in the use of portable electronic devices such as mobile telephones and notebook computers and the emerging trend of using rechargeable batteries in hybrid electric vehicles has created a need for smaller, lighter, longer lasting rechargeable batteries to provide the power to the above mentioned and other battery powered devices. During the 1990s, lithium rechargeable batteries, specifically lithium-ion batteries, became popular and, in terms of units sold, now dominate the portable electronics marketplace and are set to be applied to new, cost sensitive applications. However, as more and more power hungry functions are added to the above mentioned devices (e.g. cameras on mobile phones), improved and lower cost batteries that store more energy per unit mass and per unit volume are required.

Figure 1:
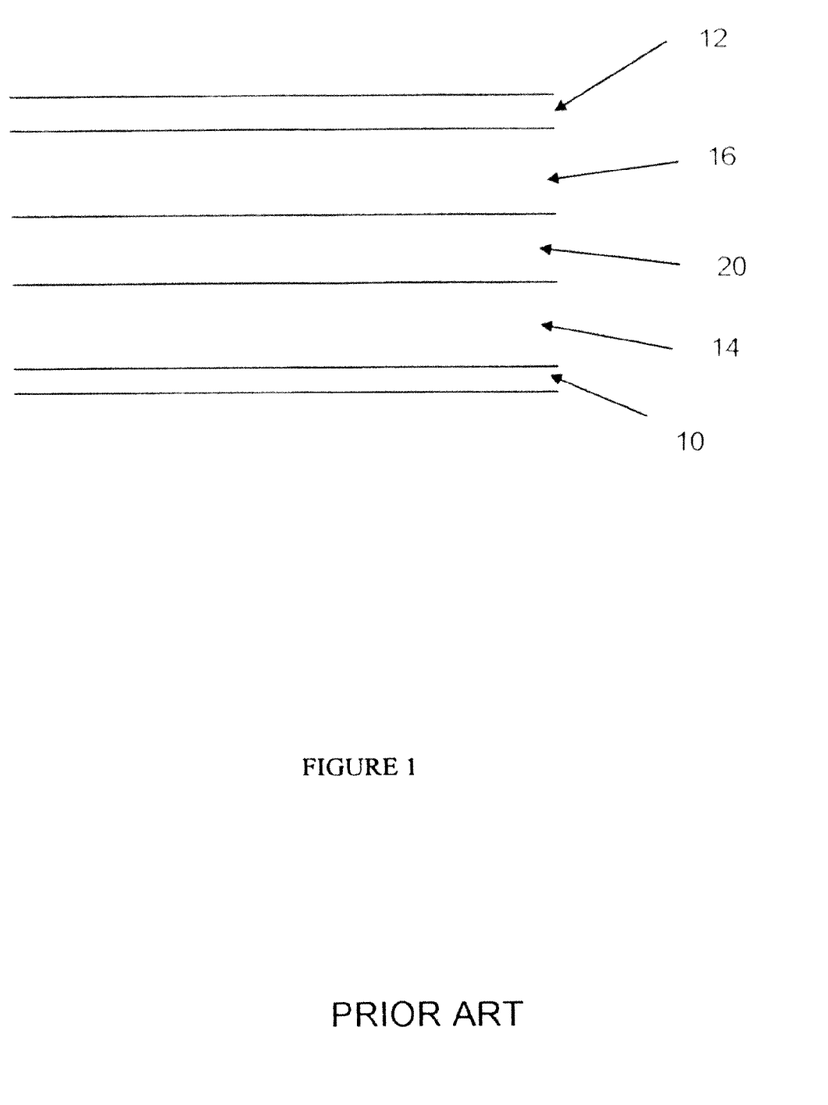
FIG. 1 is a schematic diagram showing the components of a battery cell.

The basic composition of a conventional lithium-ion rechargeable battery cell including a graphite-based anode electrode is shown in FIG. 1. The battery cell includes a single cell but may also include more than one cell.

The battery cell generally comprises a copper current collector 10 for the anode and an aluminium current collector 12 for the cathode, which are externally connectable to a load or to a recharging source as appropriate. A graphite-based composite anode layer 14 overlays the current collector 10 and a lithium containing metal oxide-based composite cathode layer 16 overlays the current collector 12. A porous plastic spacer or separator 20 is provided between the graphite-based composite anode layer 14 and the lithium containing metal oxide-based composite cathode layer 16 and a liquid electrolyte material is dispersed within the porous plastic spacer or separator 20, the composite anode layer 14 and the composite cathode layer 16. In some cases, the porous plastic spacer or separator 20 may be replaced by a polymer electrolyte material and in such cases the polymer electrolyte material is present within both the composite anode layer 14 and the composite cathode layer 16.

When the battery cell is fully charged, lithium has been transported from the lithium containing metal oxide via the electrolyte into the graphite-based layer where it has reacted with the graphite to create the compound, $LiC_6$. The maximum capacity of such an anode is 372 mAh per gram of graphite. It will be noted that the terms "anode" and "cathode" are used in the sense that the battery is placed across a load.

It is well known that silicon can be used instead of graphite as the active anode material (see, for example, Insertion Electrode Materials for Rechargeable Lithium Batteries, M. Winter, J. O. Besenhard, M. E. Spahr, and P. Novak in Adv. Mater. 1998, 10, No. 10). It is generally believed that silicon, when used as an active anode material in a lithium-ion rechargeable cell, can provide a significantly higher capacity than the currently used graphite. Silicon, when converted to the compound $Li_{21}Si_5$ by reaction with lithium in an electrochemical cell, has a maximum capacity of 4,200 mAh/g, considerably higher than the maximum capacity for graphite. Thus, if graphite can be replaced by silicon in a lithium rechargeable battery, a substantial increase in stored energy per unit mass and per unit volume can be achieved.

In order that the anode material will reversibly react with lithium to charge and discharge the cell, the silicon in the anode should be composed of small particles, which can have any suitable shape, e.g. particles, fibres, structoids or pillared particles (particles that have columns or pillars formed on their surface usually by etching). From WO2007/083155, it is known that the particles will preferably have: (a) a high aspect ratio, i.e. the ratio of the largest dimension to the smallest dimension of a particle, which is preferably about 100:1, (b) a minor dimension (the smallest dimension of the particle) of around 0.08-0.5 μm and (c) a major dimension (the largest dimension of the particle) of the order of 20-300 μm. The high aspect ratio helps in accommodating the large volume change during lithiation and delithiation of the anode, i.e. during charging and discharging of the battery without physically breaking up the particle; this volume change may be of the order of 300%. However, the formation of such small crystalline forms is time-consuming and expensive.

One known method of making silicon anode material is by selective etching of silicon-based materials to create silicon pillars. One such approach is described in U.S. Pat. No. 7,033, 936, which is incorporated herein by reference. According to this document, pillars are fabricated by creating a mask by depositing hemispherical islands of caesium chloride on a silicon substrate surface, covering the substrate surface, including the islands, with a film, and removing the hemispherical structures (including the film covering them) from the surface to form a mask with exposed areas where the hemispheres had been. The substrate is then etched in the exposed areas using reactive ion etching and the resist is removed, e.g. by physical sputtering, to leave an array of silicon pillars in the unetched regions, i.e. in the regions between the locations of the hemispheres.

An alternative, chemical approach is described in WO2007/083152 in the name of the present applicants. According to this method, silicon is etched using a solution containing HF and $AgNO_3$. The mechanism postulated is that isolated nanoclusters of silver are electrolessly deposited on the silicon surface in an initial stage. In a second stage, the silver nanoclusters and the areas of silicon surrounding them act as local electrodes that cause the electrolytic oxidation of the silicon in the areas surrounding the silver nanoclusters to form $SiF_6$ cations, which diffuse away from the etching site to leave the silicon underlying the silver nanocluster in the form pillars. The etched silicon can either be removed from the silicon substrate or used while still attached to the substrate.

The etching of silicon to form anode material is expensive to carry out and involves highly corrosive materials such as HF, which are difficult to handle.

Other methods for making the same type of high aspect ratio structures have also been presented in the literature including electrochemical etching of silicon, and deposition of fine Si structures using CVD, PECVD and sputtering, or SLS or VLS deposition such as VLS using Au catalysts. All these methods require varying levels of expense but all are above that of the method of the present invention.

Aluminium-silicon alloys are hard and wear-resistant with excellent cast-ability, weld-ability and low shrinkage and are used in very large quantities industrially wherever these properties are required, e.g. in car engine blocks and cylinder heads.

DISCLOSURE OF THE INVENTION

The present invention provides an alternative method of making silicon anode material with structural elements of suitable dimensions, which can be cheaper and use less expensive raw materials than the prior art proposals.

The inventors have recognised that crystalline silicon structures are precipitated within a matrix alloy when certain metal-silicon alloys are cooled; these alloys are those in which the solubility of silicon is low and in which the quantity of intermetallics formed on cooling are low or non-existent. Such silicon structures can have the physical and structure properties required to form anode material for use in lithium ion rechargeable cells.

The first aspect of the present invention provides a method of forming silicon anode material for rechargeable cells, which method comprises: providing a metal matrix, comprising no more than 30 wt % silicon, including silicon structures dispersed therein, and etching the metal matrix to at least partially isolate or expose the silicon structures.

The claimed method provides a more economical process to obtain the anode material than is available in the prior art because the raw materials are relatively inexpensive and readily-available. It also provides a process to obtain anode material that is porous which helps to improve impregnation of the anode by the electrolyte.

DESCRIPTION OF THE DRAWINGS

FIG. 3b is a higher magnification picture of part of the surface of the structure shown in FIG. 3a;

SPECIFIC DESCRIPTION OF PREFERRED EMBODIMENTS

In overview, the present invention provides a method of producing silicon structures from using the growth of silicon precipitated within a metal-silicon alloy when cooled. The metal is then at least partially etched away to leave silicon-comprising structures. The metal is preferably aluminium because Al does not easily react with, or dissolve, Si and also because the Al—Si system provides a liquid eutectic without forming intermetallic compounds. Au—Si and Ag—Si are alternatives, but are too expensive unless a rigorous Au or Ag recovery regime is put in place. Tertiary alloys with eutectics and poor Si solubility/reactivity can also be used, e.g. aluminium alloys, such as Al—Mg—Si or Al—Cu—Si.

The structures may be discrete structural elements such as particles, flakes, wires, pillars or other structures. The structures may also be porous structures comprising structural elements, such as an agglomeration of structural elements in the form of, for example, a honeycomb structure. The structures may retain some of the metal. Although reference is made herein to silicon structures, it should be understood that at least some metal may still be present in the structure. In fact, it may be advantageous to retain some metal. It should be understood that the structures may be (mono- or poly-) crystalline or amorphous and, when they are crystalline, each structure may be composed of one or more crystals.

The inventors have realised that the silicon structures contained in the solidified metal alloy are highly suitable as a lithium-ion anode material; some residual metal may remain after etching but this does not appear to interfere with the performance of the anode material.

Figure 2:
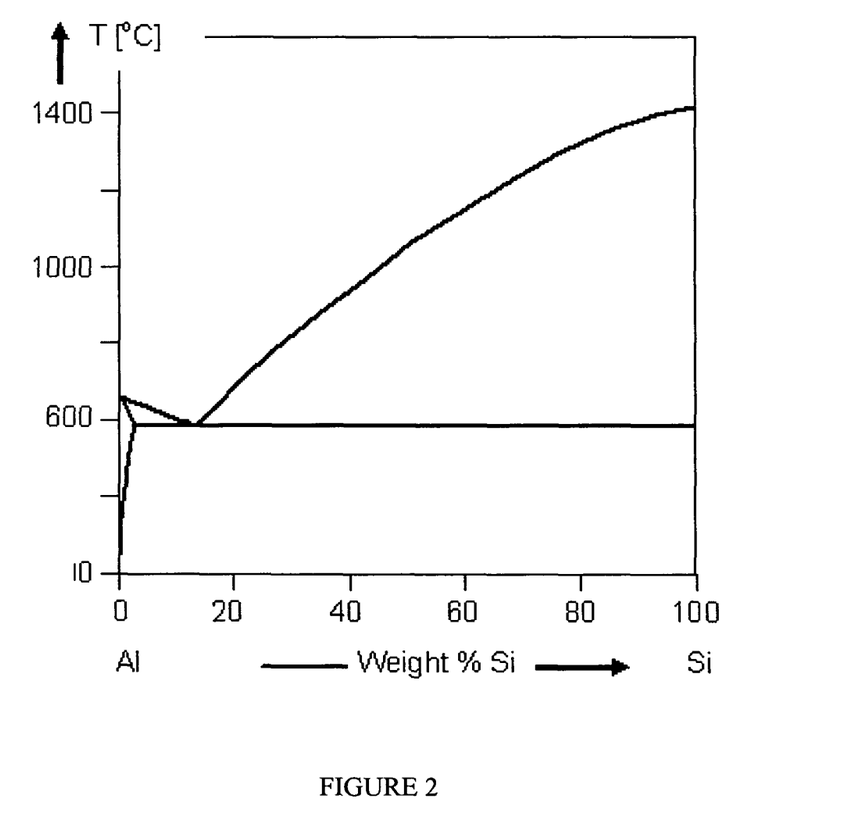
FIG. 2 shows the Al—Si phase diagram.

Aluminium dissolves extremely little in silicon and silicon is not readily dissolved in solid aluminium when cooled to room temperature. The eutectic of an Al—Si melt is approx 12.6% Si, as can be seen from the Al—Si phase diagram is shown in FIG. 2. When cooling an aluminium-silicon alloy that contains more silicon than is soluble in solid aluminium, silicon structures can be precipitated with fine dimensions including spikes, stars and flakes.

Silicon can be obtained by two mechanisms; firstly, when a melt containing more silicon than is present in a eutectic mixture cools, it precipitates silicon structures until the composition of the melt reaches the eutectic point, where the melt solidifies. This precipitated silicon can be used as the silicon structures in the present invention. Secondly the solidified solid eutectic mixture itself includes segregated silicon that can also be used as the silicon structures in the present invention. There is an obvious economic benefit from the use of a melt containing higher silicon contents since the yield of silicon from the melt is higher. However, the shape and size of the silicon structures from these two types of mechanisms are important, as discussed below, and will depend on the process conditions (such as cooling rate) that are applied and that can be achieved with the equipment available and so the melt composition and mechanism used for forming the silicon structures should be chosen to provide an optimum yield of the silicon structures of the desired shape and size.

As mentioned, a high silicon content in the metal-silicon alloy is preferred since it provides the highest yield of silicon structures that are the component material of interest. The maximum practical amount of silicon in commercial aluminium casting alloys is 22-24%, but alloys made by powder metallurgy can be up to 50% and spray forming up to 70%, although the latter two methods are more expensive and therefore less preferred unless very high silicon wt % is required. Powder metallurgy and spray forming techniques are used for so-called "master alloys" used in metal making. In embodiments, the silicon content is less than 30 wt %.

The possible range of silicon concentrations in the melt is very wide but the amount is dictated by the need to obtain, on cooling, silicon structures having structural elements having the correct shape and size for use in a battery anode, which are: (a) a high aspect ratio (at least 5 and preferably at least 10), a minor dimension of 0.1-2 μm and (c) a major dimension of 10 μm or more. A high aspect ratio gives a high number of interconnections between the silicon structures in an electrode for electrical continuity. These dimensions cover such shapes as rods, wires or plates which can be isolated elements or integral elements of a larger connected structure, such as a porous structure. The high aspect ratio helps in accommodating the large volume change during lithiation and delithiation of the anode, i.e. during charging and discharging of the battery without physically breaking up the particle; this volume change may be of the order of 300%. The size constraint region of 0.1-2 μm provides a balance between, on the one hand, providing a robust structure to increase the electrode's survival during successive charging and discharging cycles and, on the other hand, providing very small or thin particles, which will give a higher surface area which in turn tends to result in a higher first cycle loss (irreversible consumption of lithium) during the first charging cycle of the Li-ion battery.

However, the shape and size of the silicon structures are dictated not only by the composition of the melt but also by the cooling conditions, especially the rate of cooling. The faster the cooling rate, the smaller the grain size. The grain shape and size can also be altered by tempering the alloy and working the alloy (either hot or cold working) to provide the required grain size and shape. Additives can also influence the grain size (see below).

Higher levels of silicon (so called 'over-eutectic alloys containing 12-25% Si or more) may have larger grain sizes, which require much faster chilling or additives during casting to maintain the silicon structural features required. Providing the structural elements are correctly sized and shaped, the preference for higher silicon content in the melt will be advantageous for processing and cost efficiency.

Figure 3A:
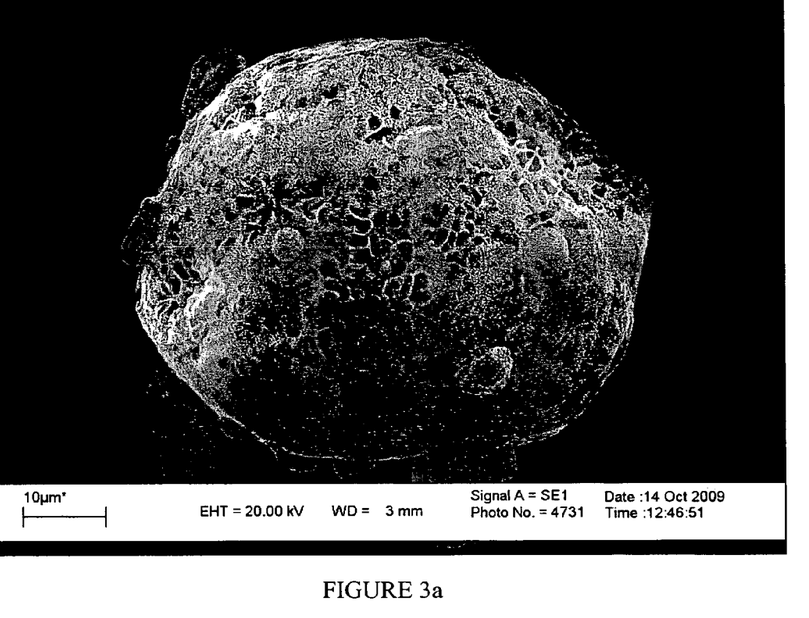
FIG. 3a shows a Al—Si structure (12 wt % Si) which has been etched in accordance with the claimed method.
Figure 3B:
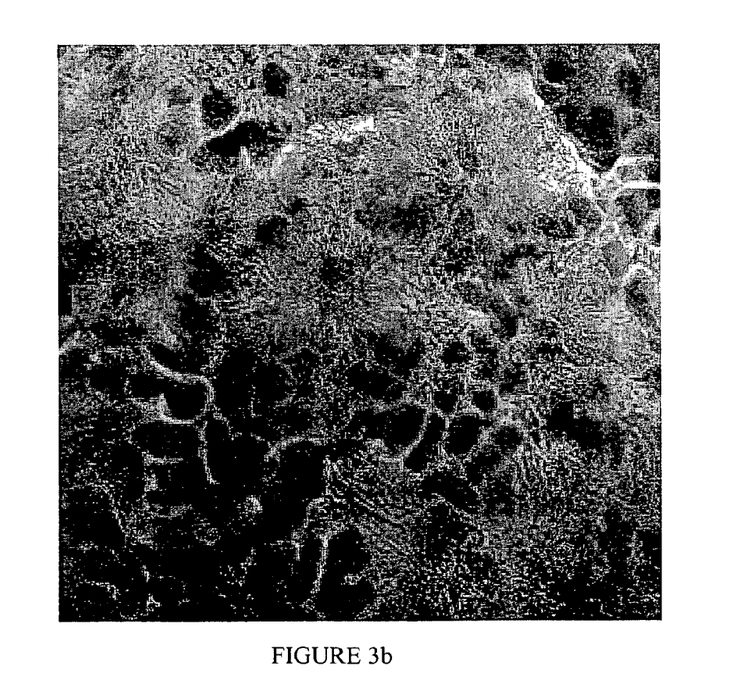
Figure 4:
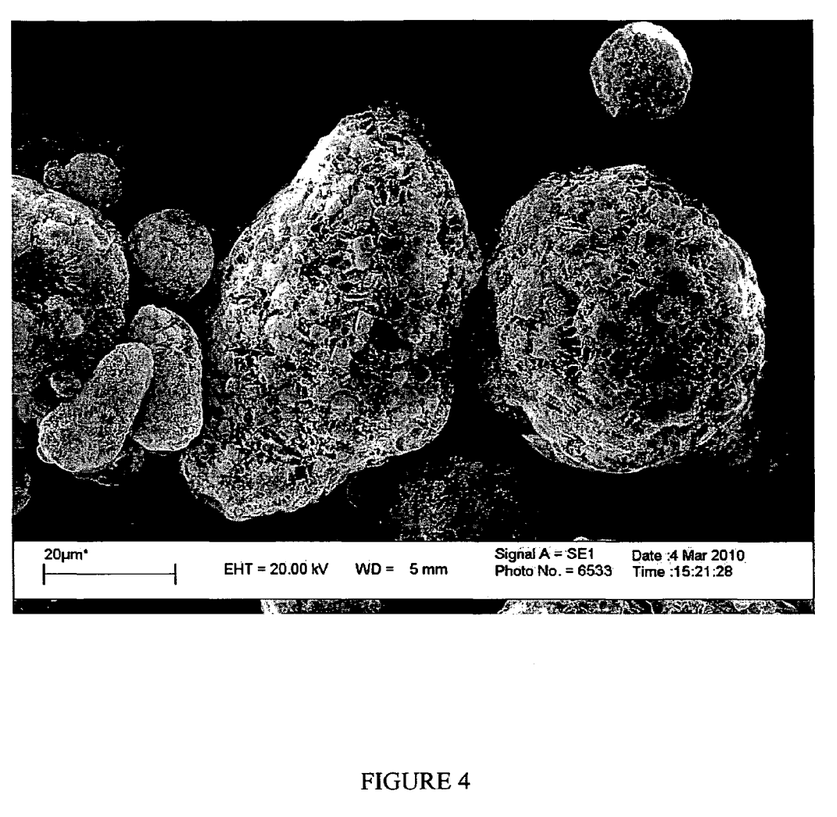
FIG. 4 shows a Al—Si particle (27.5 wt % Si) which has been etched in accordance with the claimed method.

In the use of Aluminium-Silicon alloy there will be an optimum range of silicon proportion to use in the alloy. The primary intention for the structure of the silicon is to create high aspect ratio structural elements, with the length >5 times the width and width being less than 2 μm, which are more resilient to breaking down during a cell's lithiation cycling. Where such structural elements are contained within a larger porous structure (for example, a porous particle) this provides the added benefit of improving electrolyte impregnation of the anode material. The microstructure may not be as fine a structure when the silicon proportion is increased greatly above the eutectic proportion (12.6 wt %) in the aluminium silicon alloy. Furthermore, obtaining the required structure may require much more careful cooling in solidification. FIGS. 3 and 4 respectively show 12 wt % and 27.5 wt % aluminium-silicon alloys produced by spray atomisation to make powder which was etched to leave the silicon matrix only. FIG. 3b is a magnification of part of the surface of the particle shown in FIG. 3a. In the 27.5 wt % alloy, inclusions can be seen where silicon-rich areas have formed during solidification of the alloy when compared to the fine structure which is mostly continuous on the 12 wt % alloy. Despite having these silicon rich areas, it is considered that the 27.5 wt % Si alloy's overall silicon structure may have a sufficiently fine average microstructure with good interconnection to prevent fracturing during lithiation and so still be a viable method. However at significantly higher silicon wt % (above 30 wt %) the silicon matrix will have a much greater proportion of Si-rich areas. Therefore, keeping the silicon proportion to at most 30 wt % is desirable so that the microstructure is largely (in the range 30%-100%) made from high-aspect ratio structural elements, and not requiring difficult to achieve process conditions to create fine silicon structural elements throughout the alloy.

A factor influencing the effectiveness of the silicon structures comprising structural elements as the active material in a Li-ion battery is the porosity of the porous structures. This may be as important as the microstructural dimensions and/or aspect ratio of the silicon structural elements. The 30 wt % ratio of silicon is additionally at an almost optimum maximum level for the porosity of the resulting silicon anode when used in an anode due to it having a compatible material to void ratio to allow the volumetric expansion of silicon during lithiation. Experiments by the inventors have shown that the size of the pores does not appear to greatly affect the performance of the cell, so long as the pores are open to accept electrolyte and allow lithiation. There is evidence that low porosity anodes (e.g. heavily calendared) with silicon as the predominant active material do not cycle for nearly as long as higher porosity anodes. For example, the expansion of the silicon matrix during lithiation to $Li_{13}Si_4$ at 3100 mAh/g is around 205%, which means that the volume of the silicon when lithiated will be a factor of 3.05 times larger than its starting volume. An initial open porosity leaving 30% material and 60-70% voids (not including any binders or other additives) therefore partially allows for this expansion whilst minimising detrimental 'heave' of the anode, which would result in swelling of a battery. Not all of the void volume will be filled with the expanded silicon—there will still be some heave (or swelling) of the electrode mass and the remaining void space will retain good access for electrolyte into the body of the material. It will also allow sufficient expansion when there are higher orders of lithiation used which can theoretically go up to $Li_{22}Si_5$ at 4200 mA/g. The inventors have recognised the interplay between all these factors and identified a range of silicon content which provides an advantageous metal matrix for use in a method for forming an improved silicon anode material.

The Al—Si process to form a metal matrix allows accurate control of the porosity of the porous structures, because it is possible to control the porosity by altering the amount of silicon incorporated in the initial Al—Si alloy by weight.

Common Al—Si alloys contain 7-18% Si and are used, for example, in car engines; they have fine structures and flakes of silicon (of the order of 0.5-1.0 μm thick and >10 μm long) in metallurgical specimens and such alloys may be used in the present invention especially when they have silicon towards the top of this silicon range.

The precipitated silicon can be isolated from the bulk alloy by etching away the bulk metal, provided the etching method does not etch the silicon structures but does etch the metal. Etchants may be liquid or gaseous phase and may include additives or sub-processes to remove any by-product build up which slows etching. Etching can be done chemically, e.g. (in the case of Al) using ferric chloride, or electrochemically using copper sulphate/sodium chloride electrolytes. The vast majority of known aluminium etchants/methods do not attack the fine silicon structural elements, leaving them intact after the aluminium has been etched away. Any aluminium or aluminium silicide intermetallics remaining after etching, for example adhering to the crystalline silicon, can be tolerated when the silicon is used to form an anode as they are themselves excellent Li-ion anode candidates, and so long as any aluminium and intermetallic structures have comparable thickness to the silicon they can be expected to survive Li insertion cycling. In fact, aluminium and intermetallics may also aid in making electrical contact between the silicon and metal electrode.

In addition to the factors discussed above that dictate the length and thickness of the aluminium structures so that they are suitable for the application of Li-ion batteries (the amount of silicon in the melt, the solidification rate and any post-solidification heating and/or working, e.g. tempering), the silicon structures produced in the alloy can be controlled in fineness, length and structure by additives (e.g. Sb, Cu, Mg, Zn, Mn, Cr, Co, Mo, Ni, Be, Zr, Fe, Na, Sr, P). Some additives may be deleterious in effect to producing the high aspect ratio structures desired, whereas some may alloy improved structure or ease of manufacture. The effects of these additives/contaminants is reportedly extensively in the literature, see Key to Metals Aluminum-silicon alloys, at the website ketometals.com/Article80.

The invention provides an economical way of producing fine structured silicon for Li-ion battery anodes. The method is advantageous because aluminium is relatively cheap and the silicon used may be cheap metallurgical grade silicon. Furthermore, aluminium-silicon alloys are commercially available, as discussed above, and again are relatively cheap. Foundries which can produce the alloy with a required metallurgy (and hence silicon structures) are widespread.

In addition, aluminium silicon alloy is relatively easy and cheap to etch since the etchants of aluminium are cheap and widely available, including acids, alkalis and even salts when etching electrochemically. The most common commercially practised method of aluminium etching involves caustic etching using an etchant containing 10-20% NaOH. The etchant will be selected to prevent substantial attack of the silicon by the etchant, and so a lower concentration of NaOH may be preferred.

After fully etching away the metal matrix, the silicon structures will be released into the etchant. These will generally need cleaning to remove contaminants, by-products (e.g. aluminium hydroxide in caustic etching)) and remnants generated during etching, which may be achieved using acids or other chemicals, followed by rinsing and separating the silicon structures from the liquid, which may be achieved by filtering, centrifuging or other separation method. The structures may then be handled in liquid suspension.

Once the silicon structures are released (with optional particle sizing) they can be handled similarly to current silicon fibre materials to prepare an electrode (e.g. mixing with binder, coating, drying, calendaring etc). They can then be used to form an anode as set-out in WO2007/083155, WO2008/139157, WO2009/010758, WO2009/010759 and WO2009/010757, all incorporated herein by reference.

Although aluminium is preferred as the main component of the silicon alloy from which the silicon structures are precipitated, the skilled person will understand that other metals that will precipitate silicon and can be etched may be used.

The invention will now be illustrated by reference to one or more of the following non-limiting examples:

Example 1

The steps of etching an aluminium silicon alloy to obtain silicon structures are:
1. Acquire from a foundry or produce an Al—Si alloy with the desired silicon particle structure (rods or plates with smallest dimension 0.1-2 μm, larger dimensions>5 μm). The making of such alloys is commonly applied in industry for making the 4XXX group of aluminium casting alloys (see http://www.msm.cam.ac.uk/phase-trans/abstracts/M7-8.html; O. Uzun et al. Production and Structure of Rapidly Solidified Al—Si Alloys, Turk J. Phys 25 (2001), 455-466; S. P. Nakanorov et al. Structural and mechanical properties of Al—Si alloys obtained by fast cooling of a levitated melt. Mat. Sci and Eng A 390 (2005) 63-69). An example would be a commercially available Al—Si 12% alloy as cast that is cooled at a rate of approx $100°$ $Ks^{-1}$ and that is subjected to no further post-solidification heat treatment.
2. Etch the aluminium matrix away using a mixed acid reagent or caustic etching, which is a commonly practised industrial processes. Keller's reagent (2 ml HF, 3 ml HCl, 5 ml HNO3, 190 ml water) can be used as an acid etchant, especially for small samples for use in metallurgical testing. Caustic etchants e.g. NaOH 10%, can be used commercially for bulk etching. The NaOH concentration may be reduced if there is evidence of etching of the Si structures; the caustic etchant can include an oxidising agent, e.g. 8 g KMnO4+2 g NaOH in 200 ml water. During etching, the alloy is surrounded by a filter (<10 μm hole size), e.g. a woven polypropylene etching bag, to contain the released Si structures. The aluminium matrix will be substantially etched away leaving silicon structures free in the liquor and/or attached to a substrate of remaining aluminium. Attached structures can be freed using ultrasonic agitation.
3. Neutralise the etchant and separate the silicon structures from the liquor using centrifuging and/or filtration, which may be achieved using the etching bag. The Si structures released by etching are collected and subjected to an acid rinse (in the case of caustic etching) to remove any contaminants or by-products deposited during etching.
4. Rinse with deionised water 1-5 times until etchants are removed by suspending the structures in the aqueous solution.
5. Isolate the structures from the rinsing water by filtering and/or centrifuging to the required maximum moisture level, which may involve a drying step.

Example 2

1. The starting Al—Si matrix material is particles of Argon or Nitrogen-fired 12 wt % Si—Al alloy with initial particle size ranges 12-63 μm. A typical chemical analysis shows 11.7% Si+3.49% Bi, 0.45% Fe, 0.28% Mn.
2. Use an etch solution having a composition by reactants of: 5 ml concentrated 70% Nitric Acid (15.8M); 3 ml concentrated 36% hydrochloric acid (11.65M); 2 ml 40% hydrofluoric acid; and 100 ml water. The molar composition of the etch solution is therefore: 0.72M nitric acid; 0.32M hydrochloric acid; and 0.41M hydrofluoric acid.
3. Add 1.4 grams of Al—Si alloy per 100 ml etchant to the etchant in an HDPE container with a magnetic follower and stir the alloy/etch mixture at room temperature for 1-2 hours on a slow setting.
4. Turn off stirrer and leave for 16 hours for reaction to go to completion. Silicon structures settle at bottom of reaction vessel.
5. Pour off the spent etch and rinse the silicon structures with deionised water until they are pH 5/7. Between rinses, the structures may settle out slowly by gravity. Optionally, use a centrifuge to speed up the process.

FIG. 3a shows an SEM Al—Si structure (12 wt % Si) which has been etched in accordance with the above. FIG. 3b is a higher magnification of part of the surface in 3a. A network of fine silicon structures with smallest dimensions less than 2 μm (the majority have smallest dimensions less than 0.5 μm) between the pores and valleys can be clearly seen.

Example 3

As Example 2, except using 27.5 wt % silicon and the loading level during etching (step 3) is 1.5 gram per 100 ml etchant.

FIG. 4 shows a Al—Si structure (27.5 wt % Si) which has been etched in accordance with the above method. As in FIG. 3, the network of fine silicon structures can be observed together with a few larger particulate silicon structures of dimensions 2-5 μm. If the starting amount of silicon in the pre-etched alloy is increased much above 30 wt %, it is expected that the number and size of these larger silicon structures will increase and this is not preferable.

Example 4

As Example 2 except (a) the composition of the etch solution (step 2) is: 5% concentrated nitric acid; 80% concentrated phosphoric acid; and 5% glacial acetic acid; and (b) the loading level (step 3) is 50 ml etchant to 1 gram alloy.

During etching the reaction temperature may rise by 10-15° C. Most of the reaction is completed in 1-2 hours and the temperature falls back to room temperature.

Etching can be performed more vigorously by adding less water. This causes a considerable increase in the etchant temperature. For example, a two-fold increase in concentration leads to a temperature of 50-60° C.

EDX (energy-dispersive X-ray spectroscopy) analysis of a batch of 12 wt % silicon showed that there was less than 1% Al retained in the bulk silicon. There may be traces of Al left in the particle. Aluminium is a good high capacity anode element in its own right and aids electrical connectivity. It may therefore be preferable that some aluminium is retained in the silicon structure, or even connects one or more silicon structures together.

The resulting silicon structures can then be used to make a silicon anode in a known manner (after drying if necessary), as per any silicon or carbon anodic materials, e.g. mix with an appropriate binder (e.g. PAA or CMC), conductive carbon (for example, one of or a mixture of carbon black, acetylene black, fibres, carbon nanotubes etc.), then coat and dry on a copper foil current collector and calendar if required.

The silicon structures may optionally be carbon coated by, for example, thermal pyrolysis. The silicon structures (coated or uncoated) may be mixed with other active anode materials (materials which can take in and release lithium ions), for example graphite and/or hard carbon, in a composite electrode.

Figure 5:
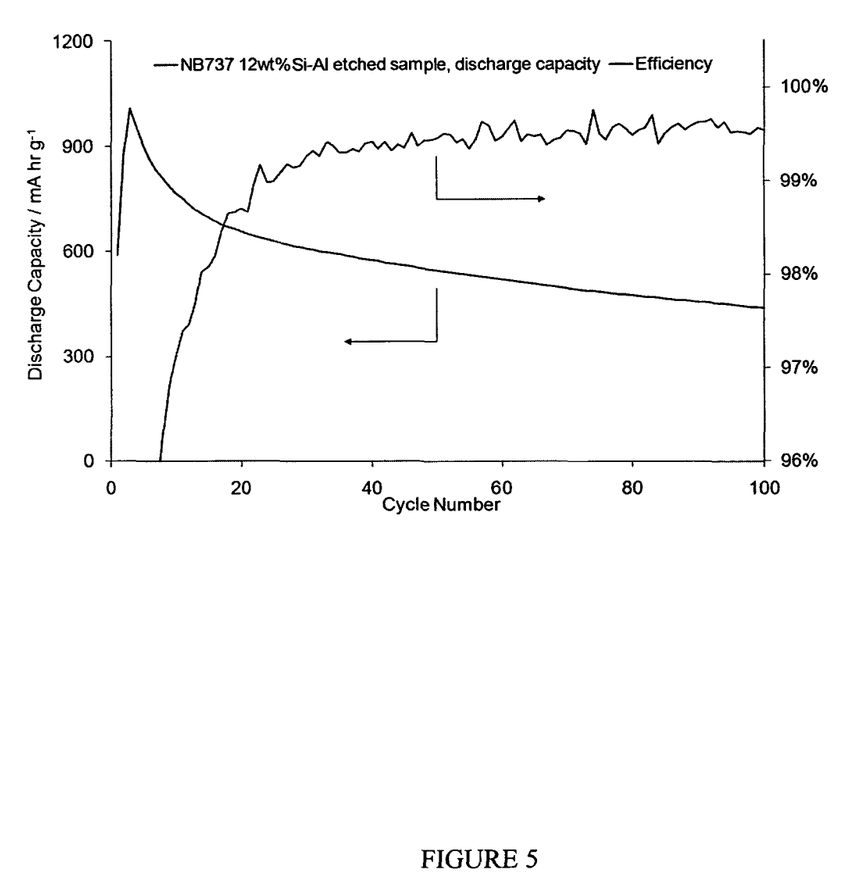
FIG. 5 shows full cell data with negative electrode made using Al—Si (12 wt % Si) etched material.

FIG. 5 is a plot of the discharge capacity and efficiency of a cell containing an anode made with silicon structures formed by the method of Example 2, over 100 cycles. The components of the cell are shown in FIG. 1. The cathode (16) was a mixed metal oxide (MMO) material $Li_{1+x}Ni_{0.8}Co_{0.15}Al_{0.05}O_2$ on an aluminium current collector (12). The anode (14) is a mixture of 76 wt % Si particles, 12 wt % carbon black and 12 wt % PAA binder on a copper current collector (10). Inbetween the cathode and anode is a porous separator (20) supplied by Tonen. The cathode, anode and separator were impregnated with an electrolyte consisting of lithium hexafluorophosphate, dissolved in a mixture of ethylene carbonate and ethyl methyl carbonate (in the ratio 3:7 vol %)

Figure 6:
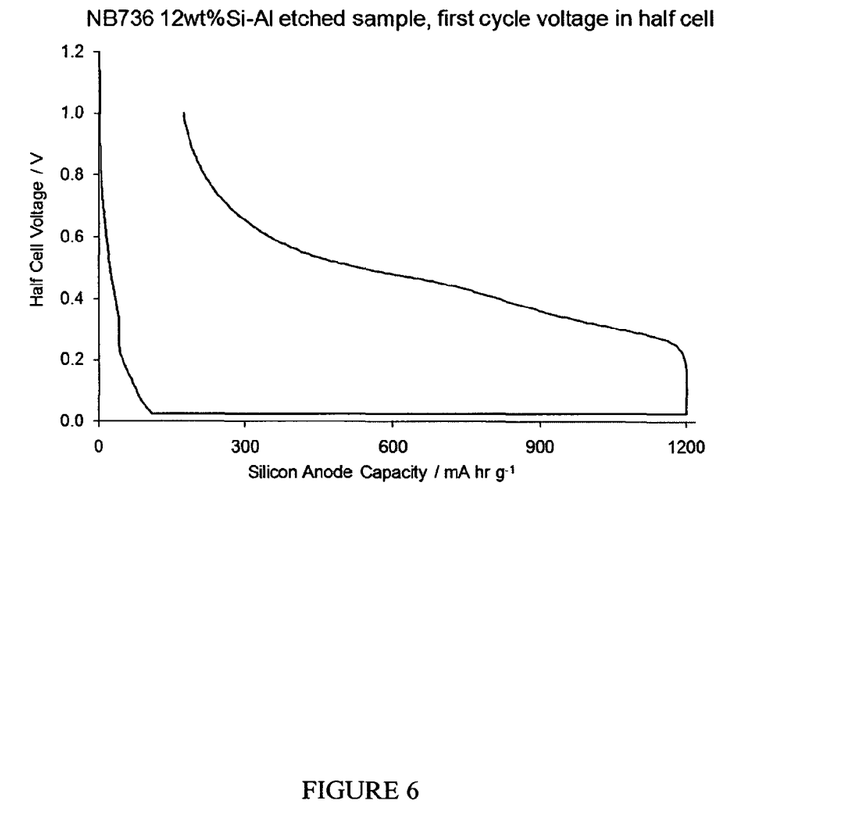
FIG. 6 shows half cell data with negative electrode made using Al—Si (12 wt % Si) etched material.

FIG. 6 shows the voltage across a half cell (where the cathode has been replaced by Lithium metal foil) and the anode made with silicon structures formed by the method of Example 2, as described above, during the first cycle charge-discharge.

For example, in order to make an alloy containing dispersed fine silicon structures, aluminium and silicon (12% silicon balance aluminium) are melted together at around 800-1000° C., which is well above the eutectic temperature of 577° C., so that they form a liquid alloy. The melt is then cooled at rates up to 100° K/s. Such a cooling period gives relatively coarse elongated flake-like structures of up to 20 µm in length and 1-5 µm wide (1-5 µm in minimum dimension) as described in "Development of Al—Si—Mg Alloys for Semi-Solid Processing and Silicon Spheroidization Treatment (SST) for Al—Si Cast Alloys", Thesis Swiss Federal Institute Of Technology Zurich, E. Ogris 2002. A 'modified' alloy, e.g. by including a small amount of Na or Sr in the alloy, or with rapid cooling such as 'chill casting', results in a more fibrous structure with smaller structures 5-10 µm in length and a sub micron width (the smallest dimension), e.g. 0.1-1 µm, as again described and shown in SEM pictures in the above referenced Ogris thesis.

Further thermal processing of the Al—Si alloy is discouraged since this can eventually lead to spheroidising of the structures which is not desired for the application because it reduces the aspect ratio of the structures.

The invention claimed is:

1. A method of forming a silicon anode material for a rechargeable cell, which method comprises:
   providing a metal-silicon alloy comprising a metal matrix and silicon structures dispersed in the metal matrix, the metal-silicon alloy including no more than 30 wt % silicon,
   at least partially etching the metal matrix to release particulate silicon structures from the metal matrix, and
   collecting the particulate silicon structures to provide the silicon anode material.

2. A method according to claim 1 wherein the metal matrix including silicon structures dispersed therein is made by a process comprising solidifying a molten metal-silicon alloy.

3. A method according to claim 1, wherein the metal-silicon alloy comprises 7-25 wt % silicon.

4. A method according to claim 1 wherein the metal is aluminium or an aluminium alloy containing at least 50 wt % aluminium.

5. A method according to claim 4 wherein the etching is performed chemically or electrochemically using an etchant comprising one or more acids, one or more alkali, or using an ionic solution optionally in combination with at least one alkali.

6. A method according to claim 1, wherein the particulate silicon structures comprise crystalline silicon.

7. A method according to claim 1, wherein the particulate silicon structures comprise structural elements and at least 80% of the structural elements have a size and shape such that they have an aspect ratio of at least 5, and a minor dimension (i.e. the smallest dimension of the structural element) of 0.1-2 µm and a major dimension (i.e. the largest dimension of the structural element) of at least 5 µm.

8. A method according to claim 7 wherein the metal-silicon alloy is made by a process comprising cooling step and wherein the cooling step is controlled so that the matrix is cooled at a predetermined rate in order to provide silicon structures having the said size and shape.

9. A method according to claim 7 wherein the metal matrix also includes one or more modifiers selected from Sb, Cu, Mg, Zn, Mn, Cr, Co, Mo, Ni, Be, Zr, Fe, Na, Sr, and P, to provide structural elements having the said size and shape.

10. A method according to claim 7 which comprises the step of tempering the metal-silicon alloy prior to etching to provide structural elements having the said size and shape.

11. The method of claim 1 wherein the released particulate silicon structures are porous.

12. The method of claim 1 wherein the released particulate silicon structures include residual metal from the metal matrix.

13. A method of forming a silicon anode material for rechargeable cells, which method comprises:
   providing particles comprising a metal-silicon alloy comprising a metal matrix and silicon structures dispersed in the metal matrix, the metal-silicon alloy including no more than 30 wt % silicon, and
   at least partially etching the metal matrix of the metal-silicon alloy of the particles to form porous silicon particles by removal of metal from the metal-silicon alloy, the porous silicon particles comprising a plurality of interconnected structural elements.

14. The method of claim 13 wherein the interconnected structural elements of the porous silicon particles have aspect ratios of at least five.

15. The method of claim 13 wherein the porous silicon particles include residual metal from the metal matrix.

16. A method of forming a silicon anode material for rechargeable cells, which method comprises:

providing a metal-silicon alloy comprising a metal matrix and silicon structures dispersed in the metal matrix, the metal-silicon alloy including no more than 30 wt % silicon, and at least partially etching the metal matrix of the metal-silicon alloy to form a porous silicon structure by removal of metal from the metal-silicon alloy, the porous silicon structure comprising a plurality of interconnected structural elements.

17. The method of claim 16 wherein the interconnected structural elements of the porous silicon structure have aspect ratio of at least five.

18. The method of claim 16 wherein the porous structure includes residual metal from the metal matrix.

19. The method of claim 11, wherein the porous particulate silicon structures comprise a plurality of interconnected structural elements.

20. The method of claim 19, wherein at least 80% of the structural elements have a size and shape such that they have an aspect ratio of at least 5, and a minor dimension (i.e. the smallest dimension of the structural element) of 0.1-2 µm and a major dimension (i.e. the largest dimension of the structural element) of at least 5 µm.

21. The method of claim 16, wherein at least 80% of the structural elements have a size and shape such that they have an aspect ratio of at least 5, and a minor dimension (i.e. the smallest dimension of the structural element) of 0.1-2 µm and a major dimension (i.e. the largest dimension of the structural element) of at least 5 µm.

22. The method of claim 13, wherein at least 80% of the structural elements have a size and shape such that they have an aspect ratio of at least 5, and a minor dimension (i.e. the smallest dimension of the structural element) of 0.1-2 µm and a major dimension (i.e. the largest dimension of the structural element) of at least 5 µm.

23. The method of claim 19, wherein the metal matrix is substantially etched away.

24. The method of claim 16, wherein the metal matrix is substantially etched away.

25. The method of claim 13, wherein the metal matrix is substantially etched away.

26. The method of claim 16, wherein the metal matrix is aluminium or an aluminium alloy containing at least 50 wt % aluminium.

27. The method of claim 13, wherein the metal matrix is aluminium or an aluminium alloy containing at least 50 wt % aluminium.

28. The method of claim 16, further comprising collecting the porous silicon particles to provide the silicon anode material.

29. The method of claim 13, further comprising collecting the porous silicon structure to provide the silicon anode material.

30. The method of claim 14, wherein the metal matrix also includes one or more modifiers selected from Sb, Cu, Mg, Zn, Mn, Cr, Co, Mo, Ni, Be, Zr, Fe, Na, Sr, and P, to provide structural elements having the said aspect ratio.

31. The method of claim 17, wherein the metal matrix also includes one or more modifiers selected from Sb, Cu, Mg, Zn, Mn, Cr, Co, Mo, Ni, Be, Zr, Fe, Na, Sr, and P, to provide structural elements having the said aspect ratio.

* * * * *